Feb. 5, 1957 J. A. GREEFKES ET AL 2,780,672

DEVICE FOR SEPARATING SYNCHRONIZING PULSES AND SIGNAL PULSES WITH PULSE-CODE MODULATION

Filed Oct. 1, 1952 2 Sheets-Sheet 1

Inventors
Johannes Anton Greefkes
Piet van Tilburg
By [signature]
Agent

INVENTORS
JOHANNES ANTON GREEFKES
PIET VAN TILBURG

BY

Frea M Vogel

AGENT

United States Patent Office 2,780,672

Patented Feb. 5, 1957

2,780,672

DEVICE FOR SEPARATING SYNCHRONIZING PULSES AND SIGNAL PULSES WITH PULSE-CODE MODULATION

Johannes Anton Greefkes and Piet van Tilburg, Eindhoven, Netherlands, assignors to Hartford National Bank and Trust Company, Hartford, Conn., as trustee Application October 1, 1952, Serial No. 312,614

Claims priority, application Netherlands November 28, 1951

1 Claim. (Cl. 179—15)

The invention relates to improvements in or modifications of the invention described and claimed in the copending U. S. patent application, Serial No. 221,022, filed April 14, 1951, now abandoned. In this application is described a device for separating synchronizing pulses and signal pulses in pulse-code modulation, in which synchronizing pulses occur with a constant recurrence frequency and each synchronizing cycle comprises a plurality of signal intervals, in which signal pulses occur or do not occur in an alternation varying with the signals to be transmitted. In order to obtain a shorter finding time the synchronizing pulses in this separating device are taken from a relaxation generator which is controlled by the incoming pulses and which, upon responding, becomes insensitive for a time shorter than the synchronizing cycle and longer than a synchronizing cycle minus a signal interval.

The improvement provided by the present invention consists in that, after the desired separation has been performed, local pulses are produced in the separating device by a pulse generator which is synchronized by the incoming synchronizing pulses and switched on by a relay controlled by the selected pulses.

If, owing to interference, an incoming synchronizing pulse is suppressed, this pulse is replaced by a pulse from the local pulse generator or, in other words, the holding time of the separating device is increased.

The energizing winding of the relay is preferably included in the output circuit of a normally cut-off coincidence mixing stage, which is fed by the incoming pulses and by the selected pulses taken from the separating device and delayed for one or a multiple of the synchronizing cycle.

As an alternative, the relay may be energized by the output voltage of a pulse-time modulator, which is fed by the selected pulses.

With a preferred embodiment, in which the local pulse generator is constructed as a separate pulse generator, for example, in the form of a multivibrator, the separating device is provided with a gate circuit, which is controlled by the relaxation generator and through which the incoming pulses are supplied to the input circuit of the relaxation generator, whilst, after the relay has become operative, the pulses produced by the local pulse generator are supplied to the input circuit of the relaxation generator when the selected incoming synchronizing pulses occur.

It may also occur, however, that, when the relay responds, the relaxation generator itself is converted into the said local pulse generator.

In order that the invention may be readily carried into effect, it will now be described in detail with reference to the accompanying drawing.

Figures 1, 2:
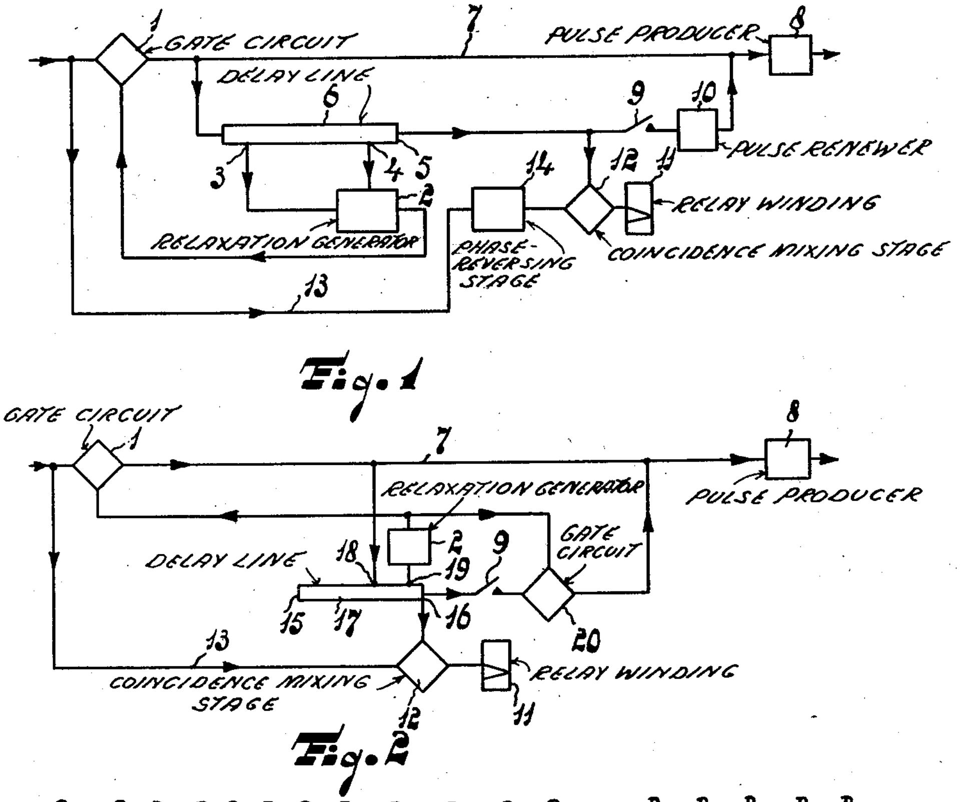
Fig. 1 shows in a block diagram a separating device according to the invention.
Fig. 2 shows in a block diagram a variation of the separating device shown in Fig. 1.

Fig. 1 shows a separating device for use in a time-multiplex receiver for pulse-code modulation in a block diagram, the device comprising, for example, five channels, i. e. four communication channels and one synchronizing channel. The synchronizing pulses selected by this separating device are used to synchronize the receiver apparatus, i. e. to distribute cyclically the incoming signal pulses among the individual channels in the rhythm of the synchronizing cycle frequency.

Figure 3:
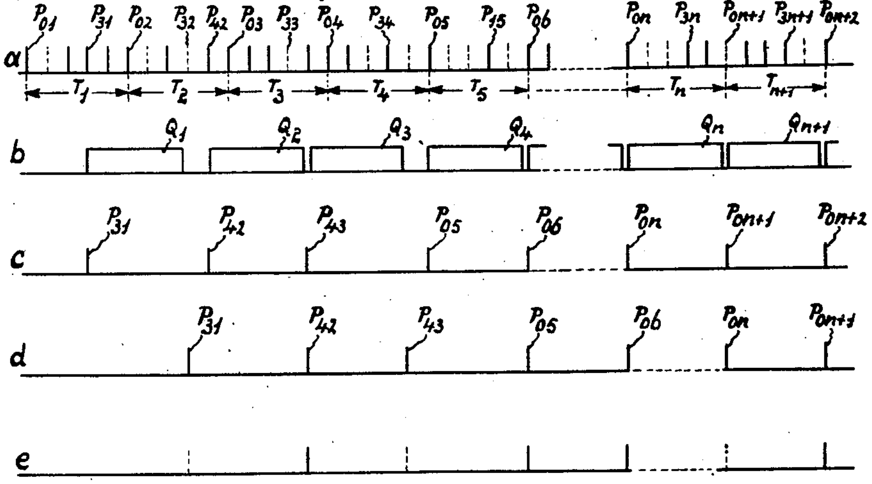
Fig. 3 shows a few time diagrams to explain the operation of the separating devices shown in Figs. 1 and 2 and Fig. 4 is a detail view of the separating device shown in Fig. 2.

The time diagram shown in Fig. 3*a* shows the pulses supplied to the separating device for a duration corresponding to $n+1$ cycle periods $T_1$—$T_{n+1}$, the periods $T_5$ to $T_n$ being omitted from the figure, and indicated by a broken line. The pulses indicated in Fig. 3*a* have, in this case, been regenerated in form and time of occurring in a preceding stage of the multiplex receiver. Each cycle period is subdivided into five intervals of equal value, the first interval being each time indicated by 0, these intervals being intended for the synchronizing pulses occurring in the cycle frequency $P_{01}$, $P_{02}$ . . . $P_{0n+2}$. The other intervals in each signal cycle are numbered in succession 1 to 4 and are intended for the signal pulses associated with four different signal channels. Fig. 3*a* indicates a number of pulses associated with the third channel and designated by $P_{31}$—$P_{3n}$, the pulses $P_{32}$, $P_{33}$ being suppressed and therefore indicated only by a broken line. In a similar manner the presence and the absence of the signal pulses associated with the other signal channels are indicated. The pulses associated with a given signal channel, for example, the pulses associated with the third signal channel are present and absent in an alternation varying with the signal to be transmitted through the channel concerned. As far as duration, amplitude and form are concerned there is no difference between the signal pulses and the synchronizing pulses. The synchronizing pulses differ from the signal pulses in that they are present in each cycle period in the time intervals concerned.

With the pulse series indicated all emitted pulses coincide with pulses of a series of equidistant pulses.

The recurrence frequency of the synchronizing pulses and the cycle frequency is, for example, 50 kc./s. and the duration of the pulses is about 0.7 $\mu$sec.

The separating device shown in Fig. 1 comprises a gate circuit 1 and a relaxation generator 2, controlling this gate circuit and connected to tappings 3 and 4 of a delay line 6, closed at its end 5 by its surge impedance. The relaxation generator 2 exhibits a stable and a metastable position; in the first stable position, which is referred to hereinafter as the position of rest, the gate circuit is open; in the second position the gate circuit 1 is cut off.

If in the position of rest of the relaxation generator 2 a synchronizing pulse is supplied to the gate circuit, which is then free, this pulse causes the relaxation generator to flap over abruptly into the operative position at the time when the front reaches the tapping 3 of the delay line, so that the gate circuit 1 is cut off. The delay between the input of the network 6 and the tapping 3 is chosen to be such that a synchronizing pulse can just pass through the gate circuit. The operative position of the relaxation generator is maintained until the front of the pulse reaches the tapping 4 of the delay line 6 and causes the relaxation generator 2 to flip back abruptly into the inoperative position. The delay between the tappings 3 and 4 is shorter than one synchronizing cycle, but longer than one synchronizing cycle minus one signal interval, so that the gate circuit is free just before a next following synchronizing pulse occurs. With a synchronizing pulse thereafter supplied to the gate circuit the cycle described is repeated.

Then, across the output of the gate circuit occur the selected synchronizing pulses, which are supplied through a lead 7 to a pulse producer 8 to synchronize the distributor circuit of the receiver, this producer being constituted in this case for example by a limiter.

With the separating device described above the input and the output pulses of the gate circuit have negative and positive polarity respectively.

If, upon switching on the receiver, the desired synchronisation does not occur, the separating device finds automatically the synchronizing pulses, which will be explained more fully with reference to the voltage-time diagrams shown in Figs. 3*a*, 3*b* and 3*c*. It is assumed, for example, that in the first cycle period the relaxation generator is excited by a signal pulse $P_{31}$ associated with the third receiving channel. Since the relaxation generator responds, the gate circuit is cut off for a time, shorter than one synchronizing cycle and longer than one synchronizing cycle minus one signal interval. The cut-off period of the gate circuit is indicated in Fig. 3*b* by a rectangular voltage block $Q_1$.

In the second cycle the relaxation generator is excited by the first pulse occurring subsequent to the indicated period of insensitivity. Owing to the absence of the signal pulse $P_{32}$ this exciting pulse is formed by the signal pulse $P_{42}$, associated with the fourth receiving channel, after which the relaxation generator becomes insensitive for the duration $Q_2$. The instant of excitation of the relaxation generator has then been shifted with respect to the synchronizing pulse.

This condition is maintained until, owing to the aforesaid shifting, a synchronizing pulse excites the relaxation generator, after which, owing to the constant presence of the synchronizing pulses, the relaxation generator is synchronized on the desired cycle frequency. The cut-off periods of the gate circuit are indicated in Fig. 3*b* by $Q_1$, $Q_2$ . . .$Q_{n+1}$.

In Fig. 3*c* are indicated the selected pulses taken from the pulse producer 8; it should be noted that the desired synchronisation is obtained within four cycle periods.

If, after the desired selection of the synchronizing pulses has been achieved, an incoming synchronizing pulse should fail, this remains nevertheless locked in the synchronizing interval with the separating device according to the invention, so that the holding time of the separating device is increased. For this purpose, according to the invention, local pulses are produced in the separating device after the desired selection of the synchronizing pulses has been achieved, since a local pulse generator is switched on, this generator having a natural frequency which is substantially equal to the synchronizing cycle frequency and being synchronized by the incoming synchronizing pulses.

As will be explained more fully hereinafter, after the desired selection of the synchronizing pulses with the embodiment shown, the switch 9 is closed.

In this condition a synchronizing pulse from the gate circuit 1 is returned, after having been delayed in the network 6, via the closed switch 9, a pulse renewer 10 and the lead 7, with the same polarity to the input of the delaying network 6. Then the total delay is made equal to one synchronizing cycle period, in other words a returned pulse occurs simultaneously with a synchronizing pulse from the gate circuit across the input of the network 6. The completed loop 6, 9, 10, 7 constitutes a pulse generator synchronized by the selected synchronizing pulses, having a natural frequency which is substantially equal to the synchronizing cycle frequency. If, for some reason or other, a synchronizing pulse fails, for example $P_{0n+1}$ (Fig. 3*a*), this pulse is replaced by a locally produced pulse from the pulse generator 6, 9, 10, 7. This is indicated in Figs. 3*b* and 3*c*.

In the closed position of the switch 9, the pulses across the lead 7 are constituted by the superimposition of the returned and incoming synchronizing pulses. These pulses are supplied to the pulse producer 8, which is constructed such that the shape and the amplitude of the output pulses of the pulse producer are independent of the closed or open position of the switch 9.

The control of the switch 9 will now be described. With the embodiment shown in Fig. 1, the switch 9 forms part of a relay, the energizing winding 11 of which is included in the output circuit of a normally cut-off coincidence mixing stage 12. To one input circuit of this coincidence mixing stage are supplied the negative incoming pulses by way of conductor 13 and a phase-reversing stage 14, and the other input voltage is constituted by the pulses from the delay line 6, delayed by one synchronizing cycle and indicated in Fig. 3*d*. Each time when the instant of occurrence of an incoming pulse coincides with a delayed pulse, the output circuit of the coincidence mixing stage has produced across it a current pulse which is indicated in Fig. 3*e*.

From this figure it is evident that in the synchronized condition of the pulse selector, each time when a synchronizing pulse is supplied to the gate circuit, an output pulse is produced across the output circuit of this coincidence mixing stage. The number of pulses occurring across the output of this mixing stage is then maximum, which means that the direct current value of these pulses is also maximum. Owing to the increase in the output direct current of the coincidence mixing stage in the synchronized condition of the separating device the relay 9, 11 responds. Thus, after the desired selection of the synchronizing pulses has been achieved, the switch 9 in the separating device 1—6 is closed, whilst thereafter this switch remains closed, even if a few of the incoming synchronizing pulses would fail owing to interference.

However, if the separating device would, accidentally, be synchronized on a signal channel, the relay 11, 9 is deenergized after a period of a few synchronizing cycles, since in this case the energizing current through the winding 11 of the relay decreases strongly.

From Fig. 3*c* it is evident that only in the synchronized condition of the separating device the selected pulses occur each time after one synchronizing cycle; in the non-synchronized condition of the separating device the interval between the selected pulses is equal to or greater than one synchronizing cycle. The relay 9, 11 may, consequently, also be energized by the output voltage of a pulse-time demodulator, controlled by the selected pulses, furnishing an output voltage, as is known, varying with the time interval between successive pulses.

Fig. 2 shows a modification of the separating device shown in Fig. 1. Corresponding elements are designated by the same references.

The separating device shown in Fig. 2 comprises a gate circuit 1 and a relaxation generator 2, controlling this gate circuit and having an inoperative position and an operative position, the gate circuit, as with the device shown in Fig. 1, being cut off during the operative position of the relaxation generator 2. In this separating device the duration of the metastable condition of the relaxation generator is determined by the delay in a delay line 17, which is short-circuited at the end 15 and closed at the end 16 by its surge impedance. The output circuits of the gate circuit 1 and the relaxation generator 2 are connected to tappings 18 and 19 of this delay line 17.

If, in the inoperative position of the relaxation generator 2, an incoming synchronizing pulse is supplied to the tapping 18, a pulsatory wave propagates towards each of the ends of the delay line 17. At the instant when the complete synchronizing pulse has passed through the gate circuit, the front of the pulsatory wave travelling towards the end 16 of the delay line 17 excites the relaxation generator 2 in the metastable operative position and thus produces a cut-off of the gate circuit 1. This exciting pulse discharges across the terminal resistor at the end 16 of the delay line 17. The cut-off condition of the gate circuit 1 is maintained for a period, shorter than one synchronizing cycle, but longer than one synchronizing cycle minus one signal interval. After this period the front of the pulse reflected with reversed polarity at the short-circuited end 15 of the delay line has reached the tapping 19 and thus causes the relaxation generator to flop back into its inoperative position. Then the cycle described is repeated when the next following synchronizing pulse occurs.

In the embodiment shown a negative synchronizing pulse supplied to the tapping 18 produces a positive pulse across the lead 7, owing to reflection at the short-circuited end of the delay line 17, after a period equal to twice the delay between the points 15 and 18. These positive pulses are suppressed by the effect of the pulse producer 8 and the negative, selected synchronizing pulses from the gate circuit 1 provide synchronisation of the relaxation multiplex receiver.

After the desired selection of the synchronizing pulses in the separating device has been achieved, the switch 9 is closed, so that a local pulse generator is formed by a completed loop constituted by the delay line 17, a gate circuit 20, controlled by the relaxation generator and cut off in the metastable condition of this relaxation generator 2 and the return lead 7 of the gate circuit 20 and the tapping 18 of the delay line 17. If an incoming synchronizing pulse is supplied to the tapping 18 of the delay line 17, this pulsatory voltage furnishes a pulsatory voltage across the terminal resistor of the end 16 of the delay line 17, after having been reflected at the short-circuited end 15 of the delay line. The transit time of this pulse across the delay line is made equal to substantially one synchronizing cycle, so that this pulse occurs at the end 16 of the delay line at an instant when the gate circuit 20 is free. Each time when a synchronizing pulse from the gate circuit 1 is supplied to the delay line 17, a returned pulse of the same polarity occurs at the tapping 18. The completed loop 17, 20, 7, 18 consequently, constitutes a pulse generator having a natural frequency equal to the synchronizing cycle frequency and being synchronized by the incoming synchronizing pulses. The pulsatory voltage propagating directly from the tapping 18 to the end 16 of the delay line exerts no influence on the operation of this generator, since the pulse across the terminal resistor at the end 16 occurs at an instant when the gate circuit 20 is cut off.

With the circuit-arrangement shown, in order to control the switch 9, the positive incoming pulses of the gate circuit 1 are supplied via the lead 13 directly to the coincidence mixing stage 12, whereas the other input voltage of this coincidence mixing stage is taken from the terminal resistor at the end 16 of the delay line 17. During each synchronizing cycle two pulses are produced across this terminal resistor by a negative pulse supplied to the tapping 18 of the delay line, i. e. a negative pulse originating from the pulsatory wave propagating with unchanged polarity to the end 16 and a positive pulse originating from the pulse reflected with reversed polarity at the short-circuited end, reaching the end 16 after a period which is substantially equal to one synchronizing cycle. The negative pulse at the end 16 of the delay line 17 does not supply an output pulse to the coincidence mixing stage. Then the coincidence mixing stage 12 and the associated relay 11, 9 operate in a completely similar manner to the circuit 12, 11, 9, shown in Fig. 1.

Figure 4:
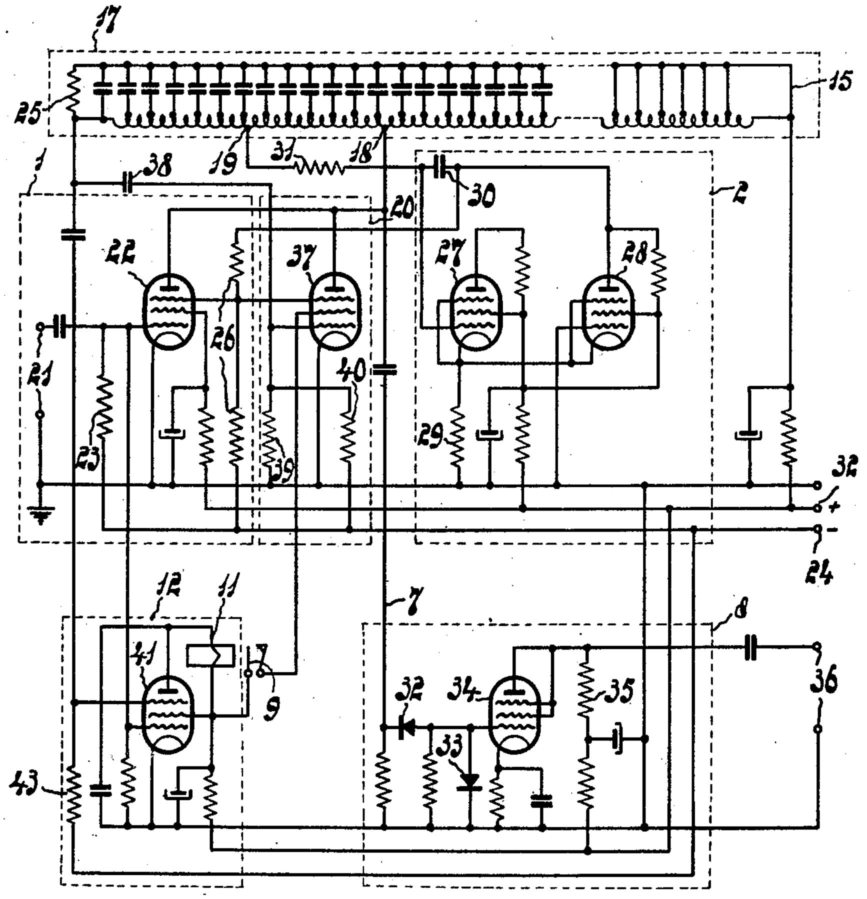

Fig. 4 shows a detail diagram of the separating device shown in Fig. 2. Corresponding elements are designated by the same reference numerals.

In the separating device shown in Fig. 4 the incoming pulses of positive polarity are supplied via input terminals 21 to the control-grid of a gate circuit, constituted by a pentode 22, the control-grid of which is connected via grid resistor 23 to the negative terminal 24 of a grid voltage battery, the anode circuit being connected to a tapping 18 of a delay line 17, closed at the end by its terminal resistor 25. The gate circuit is controlled by a control-voltage from a relaxation generator 2, this voltage being supplied via a potentiometer 26, connected between the output circuit of the relaxation generator 2 and the negative terminal 24 of the grid voltage battery, to the collecting grid of the pentode 22.

With the embodiment shown the relaxation generator 2 comprises a multivibrator having two pentodes 27 and 28, which cut off one another. The pentodes 27 and 28 have a common cathode resistor 29 and the control-grid of the multivibrator tube 27 is connected via a coupling capacitor 30 to the anode of the pentode 28. The control-grid of the pentode 27 is also connected through a grid resistor 31, tapping 19, delay line 17, to the positive terminal 32 of the anode voltage line and the control-grid of the pentode 28 is connected to earth.

This relaxation generator of a type known per se has a stable inoperative position and a metastable operative position; in the inoperative position the pentode 27 has anode current and the pentode 28 is cut off; in the operative position the pentode 28 draws anode current and pentode 27 is cut off. In the inoperative position of the relaxation generator 2 the collecting grid voltage of the pentode 22 is maximum and this tube is cut off, whilst conversely, in the operative position of the relaxation generator the collecting grid voltage of the pentode 22 is minimum and the gate circuit 1 is cut off.

If, in the inoperative position of the relaxation generator 2, a synchronizing pulse having positive polarity is supplied to the terminals 21 of the pentode 22, the latter is released and a negative voltage pulse occurs across the anode circuit. At the instant when the front of this output pulse passes by the tapping 19 of the delay line 17, the pentode 27 is abruptly cut off in known manner and the pentode 28 is conductive, so that the gate circuit 1 is cut off. This condition would be maintained for a period varying primarily with the properties of the tubes, the supply voltages and the time constant of the grid resistor 31 and the coupling capacitor 30. However, before this period has elapsed, the front of the pulse, reflected with positive polarity at the short-circuited end of the delay line has reached the tapping 19, so that the relaxation generator 2 flops abruptly into its inoperative position. The separating device described has returned into its initial position after a period which is only determined by the delay of the reflected pulse. Variation of the tube properties and the supply voltages have, consequently, no effect on the duration of insensitivity of the separating device.

The negative synchronizing pulses from the gate circuit 1 together with the pulses having positive polarity, obtained at the end 15 of the delay line 17, are supplied through the lead 7, a rectifier 32, to a control-grid of an amplifying pentode 34, connected to earth via an additional rectifier 33. The two rectifiers 32 and 33, together with the pentode 34, constitute a pulse producer 8. The circuit of the rectifiers 32 and 33 suppresses the reflected pulses of positive polarity and the synchronizing pulses of negative polarity cut off, each time, the pentode 34. Then limited positive synchronizing pulses occur across the anode resistor 35 of the pentode 34, these pulses can be taken from terminals 36.

As has been dealt with at large with reference to Fig. 2 a local pulse generator having a natural frequency equal to the synchronizing cycle frequency is formed, since a switch 9 becomes operative, after the synchronized condition of the separating device has been obtained, since a gate circuit 20 is connected between the terminal resistor 25 of the delay line 17 and the tapping 18. The gate circuit 20 comprises a pentode 37, which, is cut off in the operative position of the relaxation generator 2, by a control-voltage which is supplied through the potentiometer 26, referred to above, to the collecting grid of the pentode 37. In this circuit-arrangement the control-grid of the pentode 37 is connected via a coupling capacitor 38 to the terminal resistor 25 and the anode is connected to the tapping 18 of the delay line. Each time when the tube 37 is released by the relaxation generator 2, a synchronizing pulse of positive polarity, delayed by one synchronizing cycle, occurs across the terminal resistor 25, this pulse being returned by the pentode 37 with negative polarity to the tapping 18 of the delay line 17. Consequently an oscillation occurs in this completed loop in the rhythm of the synchronizing cycle frequency.

In the gate circuit 20 described above the control-grid of the pentode 37 has a negative bias voltage from a potentiometer 39, 40, connected between the negative voltage terminal 24 of the grid voltage battery and earth, in other words, the pentode 37 also operates as a threshold device.

The distortion of the delayed pulses across the delay line is thus appreciably reduced.

The gate circuit 20 is switched on, after the synchronized condition of the separating device has been obtained, since, when the switch 9 becomes operative, the screen-grid voltage is supplied to the pentode 37. The switch 9 forms part of a relay, the energizing winding 11 of which is included in the anode circuit of a normally cut-off coincidence mixing stage 12, formed by a pentode 41. The control-grid of the pentode 41 is connected to the input terminals 21 of the separating device and to the negative terminal 24 of the grid-voltage battery by way of the grid resistor 23 and the collecting grid is connected to the terminal resistor 25 of the delay line 17 and also to the terminal 24 of the grid-voltage battery by way of the resistor 43. Each time, when positive pulses occur simultaneously at the collecting grid and at the control-grid of the coincidence mixing stage, the pentode 41 draws anode current. After the synchronized condition of the separating device has been achieved, the mean direct current of this coincidence mixing stage increases strongly, so that the relay 11, 9 responds and the gate circuit 20 is switched on.

What we claim is:

In a multiplex receiver for intercepting pulse-code modulation signals constituted by synchronizing pulses occurring at a constant frequency and wherein each synchronization cycle comprises a succession of signal pulse intervals within which intervals signal pulses are alternatively present or absent as a function of the signals to be transmitted, the combination comprising a separating device to separate the synchronization pulses from the signal pulses including a pulse-responsive relaxation generator and means to apply the intercepted signals thereto, said generator including a circuit connected to render it temporarily insensitive after responding to a pulse, said circuit having a time-constant characteristic at which the generator upon responding to a pulse becomes temporarily insensitive for a duration smaller than that of a synchronization cycle but greater than that of a synchronization cycle minus a signal interval, whereby said device automatically hunts for said synchronizing pulses in said cycles to effect the desired selection thereof, apparatus connected to introduce a synchronization pulse into said receiver in the event a synchronizing pulse is suppressed in the incoming signal, said apparatus comprising local generator means responsive when said separating device effectuates the desired selection of an incoming synchronization pulse to produce a local pulse in synchronization therewith and a relay responsive to said selected synchronization pulse and connected to actuate said local generator means, a coincidence mixing stage having two input circuits and an output circuit, means connected to apply said pulse-code modulation signals to one of said input circuits, and a delay circuit for delaying said selected synchronizing pulses for at least one synchronizing cycle period and connected to apply delayed synchronizing pulses to the other of said input circuits, said relay having an energizing winding connected to said output circuit.

References Cited in the file of this patent

UNITED STATES PATENTS

| | | |
|---|---|---|
| 2,449,467 | Goodall | Sept. 14, 1948 |
| 2,451,044 | Pierce | Oct. 12, 1948 |
| 2,529,564 | Miller | Nov. 14, 1950 |